Patented June 13, 1939

2,161,984

UNITED STATES PATENT OFFICE 2,161,984

PROCESS FOR DEHYDROGENATION OF HYDROCARBONS

William J. Sweeney and William E. Spicer, Baton Rouge, La., assignors to Standard Oil Development Company, a corporation of Delaware No Drawing. Application December 31, 1935, Serial No. 56,913

7 Claims. (Cl. 260—683)

This invention relates to the dehydrogenation of hydrocarbons at an elevated temperature and in the presence of a catalyst. The particular object of this invention is the provision of such a process in which the reacting materials are contacted with a catalyst having a more rugged nature and a higher activity than those hitherto employed, whereby the process can be conducted for longer periods of time without interruption due to disintegration of the catalyst.

Hydrocarbons are ordinarily dehydrogenated by being conducted through an elongated upright reaction space which is packed with a catalyst. Due to the fact that the reaction temperature is relatively high, ordinarily of the order of 1000° F. and upwards, and the stream of reaction gases is quite rapid, together with the fact that the catalyst employed is of comparatively heavy nature, the portion of the catalyst in the lower part of the tower rapidly disintegrates and becomes unsuitable for use, both by reason of loss of effective surface and by reason of the fact that the fine material formed by disintegration becomes a serious obstruction to the free passage of the gaseous reaction material. In addition such catalysts usually become fouled by deposition of carbon thereon and must be periodically reactivated. This reactivation is usually effected by burning off the carbon. In this step the catalyst is subjected to even more destructive conditions than obtained in the dehydrogenation step itself, and suffers considerable deterioration.

A great many catalysts having satisfactory activity for the dehydrogenation of hydrocarbons have been proposed. The majority of these catalysts contain a difficultly reducible oxide. Among the more effective catalysts are those composed of mixtures of difficultly reducible oxides, at least one of which is an oxide of a metal of group six of the periodic system, and one is a difficultly reducible basic or amphoteric oxide, such as magnesia, silica or alumina. Such mixed catalysts are usually prepared by soaking the basic or amphoteric oxide in a solution of a salt, such as a nitrate, of the metal of group six, drying the resulting mixture and roasting it at a temperature, such as 400 to 600° C., sufficiently high to convert the nitrate into an oxide. Catalysts prepared in this manner very often can be crumbled between the fingers and are liable to cause undesirable interruptions due to clogging in the dehydrogenation process.

We have now found that dehydrogenations can be conducted for interminable periods without interruptions due to disintegration of the catalysts by being carried out in the presence of a catalyst which has been prepared by including in its initial composition, in addition to the active catalystic ingredient, at least two substances, not having an adverse action in the dehydrogenation process, capable of reacting with each other at a temperature substantially higher than the temperature employed in the dehydrogenation process to form a compound having a fusion temperature considerably above the temperature of the dehydrogenatiton reaction and heating the mixture for a substantial period at the reaction temperature of said two substances for a length of time sufficient to impart to the catalyst the desired strength. The temperature to which the catalyst composition must be heated in order to acquire strength is usually at least 1600° F.

In case the catalyst mixture already comprises as its major ingredient a difficultly reducible oxide of acidic nature, the added substance is preferably a basic oxide such as magnesia, lime or barium oxide. If, one the other hand, a difficultly reducible oxide of basic nature is initially the major ingredient of the catalyst, the substance added to impart strength is preferably an acidic oxide such as alumina, silica, boric acid, chromium oxide, molybdic acid, tungstic acid, phosphoric acid, etc. Where the difficultly reducible oxide initially associated with the catalyst as the major ingredient is amphoteric, the added substance should preferably be of acidic nature, such as boric acid or phosphoric acid. Other substances which are capable of reacting with the oxide initially associated with the catalyst to form therewith a double compound, such as fluorides, silicates, such as sodium silicate, hydrophosphates, etc., may be employed as addition agents.

As before stated many suitable catalysts for this reaction initially contain a sixth group metal oxide as the active ingredient and a basic oxide as the major ingredient. The heating step should not be conducted for such a length of time as to cause the formation of a high melting compound of the two oxides in an amount substantially in excess of 10% of the total catalyst composition. Due to the difficulty of controlling such a heating step in such a manner as to avoid fusion of the entire active ingredient with the major oxidic ingredient with a consequent loss of activity of the active ingredient, it is preferable to add to such a catalyst a small amount of an acid substance having a greater affinity for the basic oxide than does the active ingredient of the catalyst. Likewise when the major oxidic ingredient is of an acid or amphoteric character it is preferable to add a basic substance having a greater reactivity with said oxidic ingredient than does the active ingredient.

In any case, when a reactive substance is added to the catalyst mixture, it should be added only in such amounts as to form, on reaction with an oxide already contained in the catalyst, a high melting compound in an amount not substantially exceeding 10% of the total catalyst composition. The same is true where two reactive substances are added to the catalyst.

Wherever in the specification or in the appended claims an acidic substance is mentioned, reference is had to a substance which, in water solution, gives an acid reaction or which, in a chemical compound, constitutes all or part of the anion. Wherever a basic substance is mentioned, reference is had to a substance which, in water solution, gives an alkaline reaction or, in a chemical compound, constitutes all or part of the cation.

The changes which occur during the high temperature heating step of the process of the present invention are not clearly understood. It may be that one of the reactive substances melts, thereby forming a physical bond between the various particles of the catalyst whether or not a reaction occurs. Again it may be that a reaction product is formed and is fused at the temperature employed and constitutes the physical bond. In any event, the heating step, when conducted at a sufficiently high temperature, usually at least 1600° F., with the addition of the strength increasing substance, effects a marked increase in the strength of the catalyst.

According to the present invention the catalyst is preferably employed in pilled form. The substance added to impart strength is introduced into the catalyst composition and the mixture is molded into pills under a high pressure. The pilling operation may be facilitated by use of lubricants, such as high molecular weight fatty acids, heavy oils and graphite. The pills resulting from the molding operation are subjected to the high-temperature strength-imparting heating step.

The best results are obtained when the final heating step is conducted at a temperature of about 2000° F. for a period ranging from ten to twenty hours. In cases where this high temperature reduces the activity of one or more of the catalytic components, the heating step may be conducted for a longer period at a lower temperature above 1600° F. In general the time of the heating step, for a given increase in strength, may be said to vary inversely with the temperature.

The present invention may be more clearly understood from the following illustrative examples.

Example I

A catalyst mixture composed of 4% of chromic oxide, by weight, and 96%, by weight, of alumina, obtained by saturating alumina with the required amount of a solution of chromium nitrate and heating at about 350° F. is mixed with 1% of graphite and 2% of boric acid and compressed into pills. The pills had an initial strength of 240 lbs./sq. in. Upon being heated for twenty hours at 1500° F. the pills had a strength of 103 lbs./sq. in. The same pills, when heated for twenty hours at 1700° F. had a strength of 1300 lbs./sq. in.

In several runs, butane was passed over these pills at a temperature varying between 900° F. and 1100° F. In these runs the butane was converted into unsaturates, mainly butylenes, in amounts varying between 20% and 50% of the initial material. No indication of disintegration of the catalyst, as for example the formation of fines, was noticed.

The same catalyst when prepared without the use of boric acid showed an initial strength after pilling of 310 lbs./sq. in., but after being subjected to 1800° F. for twenty hours, crumbled readily between the fingers.

The same catalyst, without the preliminary heating at 350° F. and without the use of boric acid, formed satisfactory pills, having an initial strength of 206 lbs./sq. in., but on heating at 1700° F. for twenty hours exhibited a strength of only 105 lbs./sq. in. and gave evidence of disintegration when used for dehydrogenation.

Catalysts comparable in durability and activity to that obtained by use of boric acid were produced by the use, instead of 2% of boric acid, of 3% of $H_3PO_4$ and 1% NaF, respectively.

Example II

A catalyst mixture composed of one molecular weight of chromic oxide and 150 grams of magnesia was pilled under high pressure. The pills, when heated for twenty hours at 1800° F., had a resistance to crushing of 2150 lbs./sq. in. Prior to the heating step the pills had a resistance to crushing of 350 lbs./sq. in. The strengthened pills exhibited, substantially, the same activity in the dehydrogenation of butane as that described in Example I.

The same catalyst, when made up with 1% of graphite and 2% of boric acid, displayed, after being heated for twenty hours at 1700° F., a resistance to crushing of 2670 lbs./sq. in. On being heated for twenty hours at 2000° F. the pills had a resistance to crushing of 5400 lbs./sq. in.

In all cases, this catalyst, on use in the dehydrogenation of hydrocarbons, showed no tendency to disintegrate.

In some cases the catalyst suffers a loss in activity by oxidation during the heating step above 1800° F. This may be avoided by conducting the heating step in a reducing atmosphere or in an inert atmosphere, or by following the heating step with a treatment with hydrogen or other reducing gas at the same temperature.

Having thus described the nature and objects of our invention and illustrated the same by practical embodiments which obviously do not define the limits of our invention, what we claim as new and useful and desire to secure by Letters Patent is:

1. A process for the dehydrogenation of hydrocarbons which comprises passing a hydrocarbon through an elongated upright reaction zone maintained at a temperature within the approximate limits of 900 and 1100° F. and packed with a catalyst, in the form of pills, consisting of an oxide of a metal of group six of the periodic system, alumina and the reaction product of alumina and a solid acidic inorganic substance, said catalyst having been obtained by incorporating with the mixed oxides a small amount of a lubricant and a small amount of a solid acidic inorganic substance capable of reacting with alumina at a temperature substantially above the dehydrogenation temperature to form a compound having a fusion temperature of at least about 2000° F., molding the mixture thus obtained into pills and heating said pills at a temperature of at least 2000° F. but insufficient to effect a complete fusion of said pills for a sufficiently long time to materially increase their mechanical strength.

2. A process according to claim 1 in which the substance added for reaction with alumina is boric acid.

3. A process according to claim 1 in which the acidic inorganic substance is added in an amount less than 10%.

4. A process for dehydrogenation of hydrocarbons, which comprises passing a hydrocarbon through an elongated upright reaction zone maintained at a temperature within the approximate limits of 900° F to 1100° F. and packed with a catalyst, in the form of pills, consisting of as its essential active catalytic component an oxide of a metal of group 6 of the periodic system associated with a major portion of a substance selected from the group consisting of alkaline earth metal oxides and amphoteric oxides, said catalyst having been obtained by incorporating with the mixed oxides a small amount of a solid acidic inorganic substance, molding the mixture thus obtained into pills and heating said pills at a temperature of at least 1600° F. but insufficient to effect complete fusion of said catalyst mass for a sufficiently long time to materially increase their mechanical strength.

5. A process according to claim 4 in which the active ingredient of the catalyst is chromic oxide, the major ingredient is alumina, and the added acidic substance is boric acid.

6. A process according to claim 4 in which the active ingredient of the catalyst is chromic oxide, the major ingredient is magnesia, and the added acidic substance is boric acid.

7. Process according to claim 1 in which the hydrocarbon material treated consists essentially of butane, whereby a product is produced containing about 20 to 50% of unsaturates consisting mainly of butylenes.

WILLIAM J. SWEENEY.
WILLIAM E. SPICER.